(12) United States Patent
Choi

(10) Patent No.: US 7,752,801 B2
(45) Date of Patent: Jul. 13, 2010

(54) LURE

(75) Inventor: Eric Eun-Ha Choi, Fukuoka (JP)

(73) Assignee: Duel Co., Inc., Fukuoka (JP)

( * ) Notice: Subject to any disclaimer, the term of this patent is extended or adjusted under 35 U.S.C. 154(b) by 0 days.

(21) Appl. No.: 11/651,615

(22) Filed: Jan. 10, 2007

(65) Prior Publication Data

US 2008/0163539 A1      Jul. 10, 2008

(51) Int. Cl.
*A01K 85/01*      (2006.01)
(52) U.S. Cl. .................................. 43/42.34; D22/126
(58) Field of Classification Search ............. 43/42.34, 43/42.32; D22/126
See application file for complete search history.

(56) References Cited

U.S. PATENT DOCUMENTS

| | | | | | |
|---|---|---|---|---|---|
| 644,911 | A | * | 3/1900 | Hedgeland | 43/42.21 |
| 1,541,032 | A | * | 6/1925 | Dumouchel | 43/42.32 |
| 1,862,893 | A | * | 6/1932 | Holtzclaw | 43/42.34 |
| 2,188,753 | A | * | 1/1940 | Jennings | 43/42.32 |
| D161,716 | S | * | 1/1951 | Starkey | D22/129 |
| 2,547,240 | A | * | 4/1951 | Young et al. | 43/42.34 |
| 2,736,125 | A | * | 2/1956 | Perkins | 43/42.34 |
| 2,833,079 | A | * | 5/1958 | Flaska | 43/42.34 |
| 2,996,826 | A | * | 8/1961 | Lamar | 43/42.32 |
| 3,122,853 | A | * | 3/1964 | Koonz et al. | 43/42.24 |
| 3,133,372 | A | * | 5/1964 | Born | 43/42.34 |
| 3,540,144 | A | * | 11/1970 | Gurka | 43/42.33 |
| 3,656,253 | A | * | 4/1972 | Gaunt | 43/42.33 |
| D242,349 | S | * | 11/1976 | Pitrola | D22/126 |
| D284,497 | S | * | 7/1986 | Millroy | D22/126 |
| 4,631,854 | A | * | 12/1986 | Rosko | 43/42.34 |

OTHER PUBLICATIONS

Fishing Tackle Catalogue 2005, Duel, pp. 1-20.

* cited by examiner

*Primary Examiner*—Troy Chambers
(74) *Attorney, Agent, or Firm*—Westerman, Hattori, Daniels & Adrian, LLP

(57) ABSTRACT

The invention relates to a fishing lure. The lure of the invention has long projections extending in a short direction formed in a plurality of columns on the lure main body, and a long groove traversing the long projections of the plurality of columns formed thereon. A predetermined color is given to a left side surface of the long projection, and a color different from the above color is given to a right side surface of the long projection. The color of the lure changes according to a viewing direction. Furthermore, air bubbles are unlikely to attach when the lure is floating in water.

18 Claims, 13 Drawing Sheets

LURE

BACKGROUND OF THE INVENTION

1. Field of the Invention

The present invention relates to a lure used in fishing.

2. Description of the Related Art

A lure includes a lure main body which is made to resemble a small fish, shrimp etc. and a fish hook attached to the lure main body. The lure is one type of fishing gear used by being connected to a line and being thrown into the sea etc. As the lure floats in water, a fish becomes interested in the lure and preys on the lure mistaking it as an actual bait. The term "fish" in the present specification refers to a target of fishing using the lure, and may include a squid and octopus.

Fishing using the lure has recently become popular. On the other hand, the number of fishes to be fished (hereinafter "fish to be fished" is referred to as "target fish") is decreasing. Thus, the target fishes become familiar with the lure and tend not to prey on (bite) the lure. The preying on the lure also extremely lessens depending on tidal current and time of fishing.

Conventionally, lures in various colors are proposed to enhance the prey on the lure by the target fishes. However, the color does not change if the lure is simply given a color. The relevant lure thus cannot sufficiently stimulate the interest of the target fish.

The inventors of the present invention have thus created a lure of which color changes depending on an viewing angle and proposed the relevant lure in publication (Duel Co. Domestic Product Catalogue "FISHING TACKLE CATALOGUE 2005" P. 14).

The lure of which color changes depending on the viewing angle has a configuration as shown in FIG. 13.

In FIG. 13, the lure 10 includes a lure main body 12 formed into an elongate small fish shape, elongate projections 13 projecting from a surface of the lure main body 12, and a fish hook 16. The elongate projections 13 are elongate projecting portions where the projections projecting from the lure main body 12 are continuously connected in a short direction of the lure main body 12, and are formed into a ring shape on a periphery of the lure main body 12. The respective elongate projections 13 are formed parallel in a plurality of columns at a predetermined interval in a longitudinal direction of the lure main body 12. Furthermore, a first colored part 17 given a certain color (e.g., red) is arranged on a left side surface of the elongate projection 13, as shown in FIG. 14. A second colored part 18 given a color (e.g., blue) different from the color of the first colored part 17 is arranged on a right side surface of the elongate projection 13.

According to the lure 10 of the above configuration, only the color (e.g., red) given to the left side surface of the elongate projection 13 is seen when the lure is viewed diagonally from the left. When the lure 10 is viewed diagonally from the right, only the color (e.g., blue) given to the right side surface of the elongate projection 13 is seen.

Therefore, the color appears to change depending on a viewing direction in the lure 10 of the above configuration.

However, a lure that resembles a real bait better than the conventional lure and that further stimulates an interest of a target fish is desired.

The conventional lure has the elongate projections extending in the short direction formed into a ring shape on the periphery of the lure main body, which elongate projections are formed parallel in the plurality of columns in the longitudinal direction. Thus, when the lure is thrown into the water, fine air bubbles tend to easily accumulate between the adjacent projections.

Furthermore, the conventional lure is less likely to produce a wave when floating in water. Thus, the conventional lure is less likely to interest the target fish, and thus needs improvement regarding the relevant aspect.

SUMMARY OF THE INVENTION

An object of the present invention is to provide a lure of which color changes depending on a viewing direction, and in which fine air bubbles are less likely to accumulate when floating in water.

Another object of the present invention is to provide a lure of which color changes depending on the viewing direction, and which produces a greater amount of waves when floating in water.

Still another object of the present invention is to provide a lure of which color changes depending on the viewing direction, and which appears to a target fish as resembling more an actual bait when floating in water.

A first lure of the present invention includes a lure main body, and long projections projecting from a surface of the lure main body and extending in one direction of the lure main body, wherein a plurality of columns of the long projections are formed lined in another direction of the lure main body; a long groove traversing the long projections of the plurality of columns is formed on the surface of the lure main body; and a first colored part given a predetermined color is arranged on a left side surface of the long projection, and a second colored part given a color different from that of the first colored part is arranged on a right side surface of the long projection.

A second lure of the present invention includes a lure main body, and long projections projecting from a surface of the lure main body and extending in a short direction of the lure main body, wherein the long projections and non-projections are alternately formed at a predetermined interval in the short direction of the lure main body, a plurality of columns in which the long projections and the non-projections are alternately connected are formed lined at a predetermined interval in a longitudinal direction of the lure main body; the long projection in an odd numbered column is arranged between the non-projection in adjacent even numbered columns; the non-projection in an odd numbered column is arranged between the long projections in adjacent even numbered columns; and a first colored part given a predetermined color is arranged on a left side surface of the long projection of the respective column, and a second colored part given a color different from that of the first colored part is arranged on a right side surface of the long projection.

A preferred aspect of the present invention is the lure in which the first colored part and the second colored part are arranged on all the long projections formed on the lure main body.

Another preferred aspect of the present invention is the lure in which one direction of the lure main body is a short direction of the lure main body.

Further, still another preferred aspect of the present invention is the lure in which a plurality of the long grooves are formed.

Moreover, Still another preferred aspect of the present invention is the lure in which the long projections are formed entirely or partially on a side surface of a core of the lure main body.

BRIEF DESCRIPTION OF THE DRAWINGS

FIG. 11A is an enlarged cross sectional view taken along line VII-VII of FIG. 8, and FIG. 11B is an enlarged cross sectional view taken along line VIII-VIII of FIG. 8;

DETAILED DESCRIPTION OF THE PREFERRED EMBODIMENTS

First Embodiment of the Invention

The invention will now be described with reference to the drawings.

Figure 1:
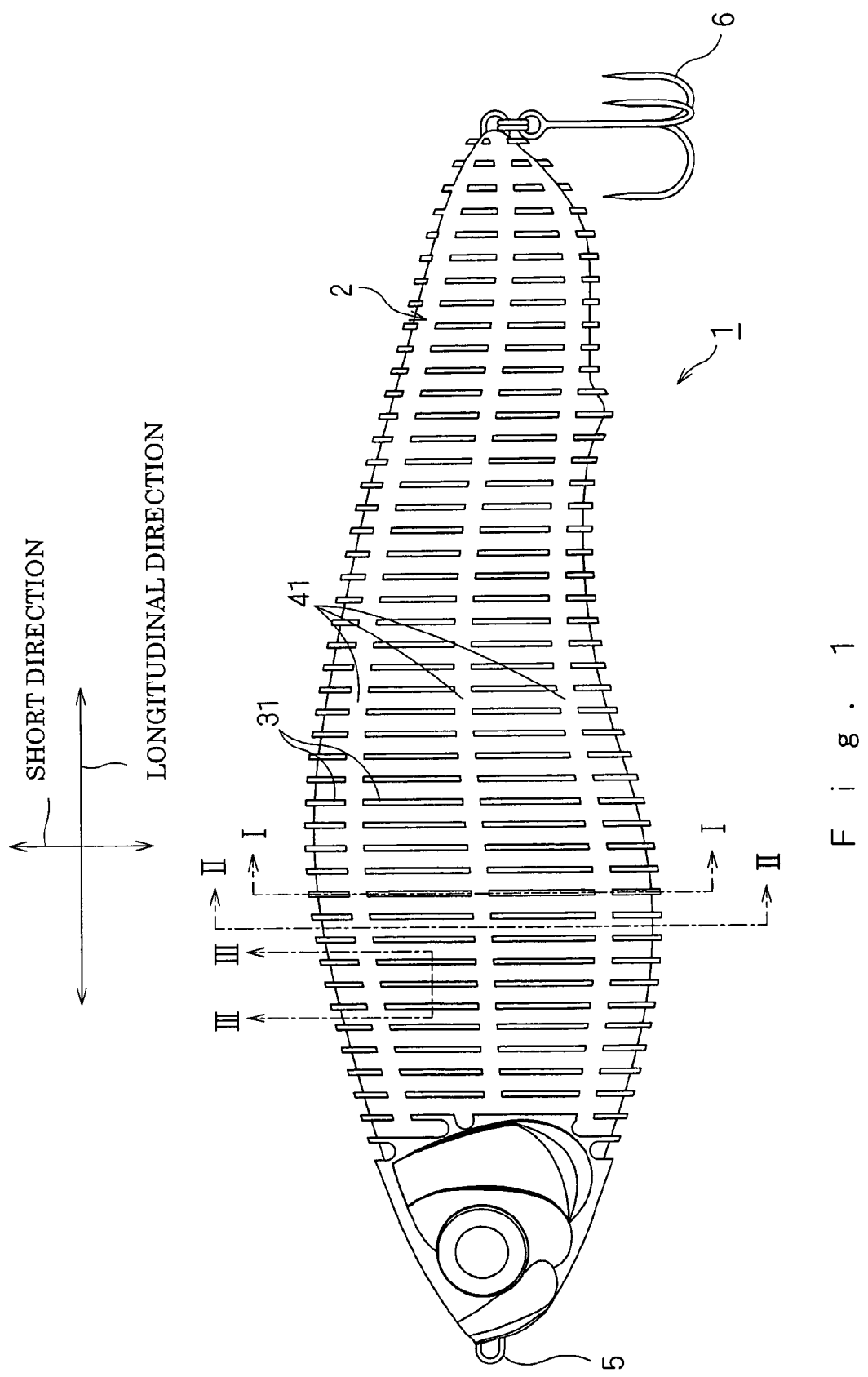
FIG. 1 is a front view of a lure of a first embodiment.
Figure 2:
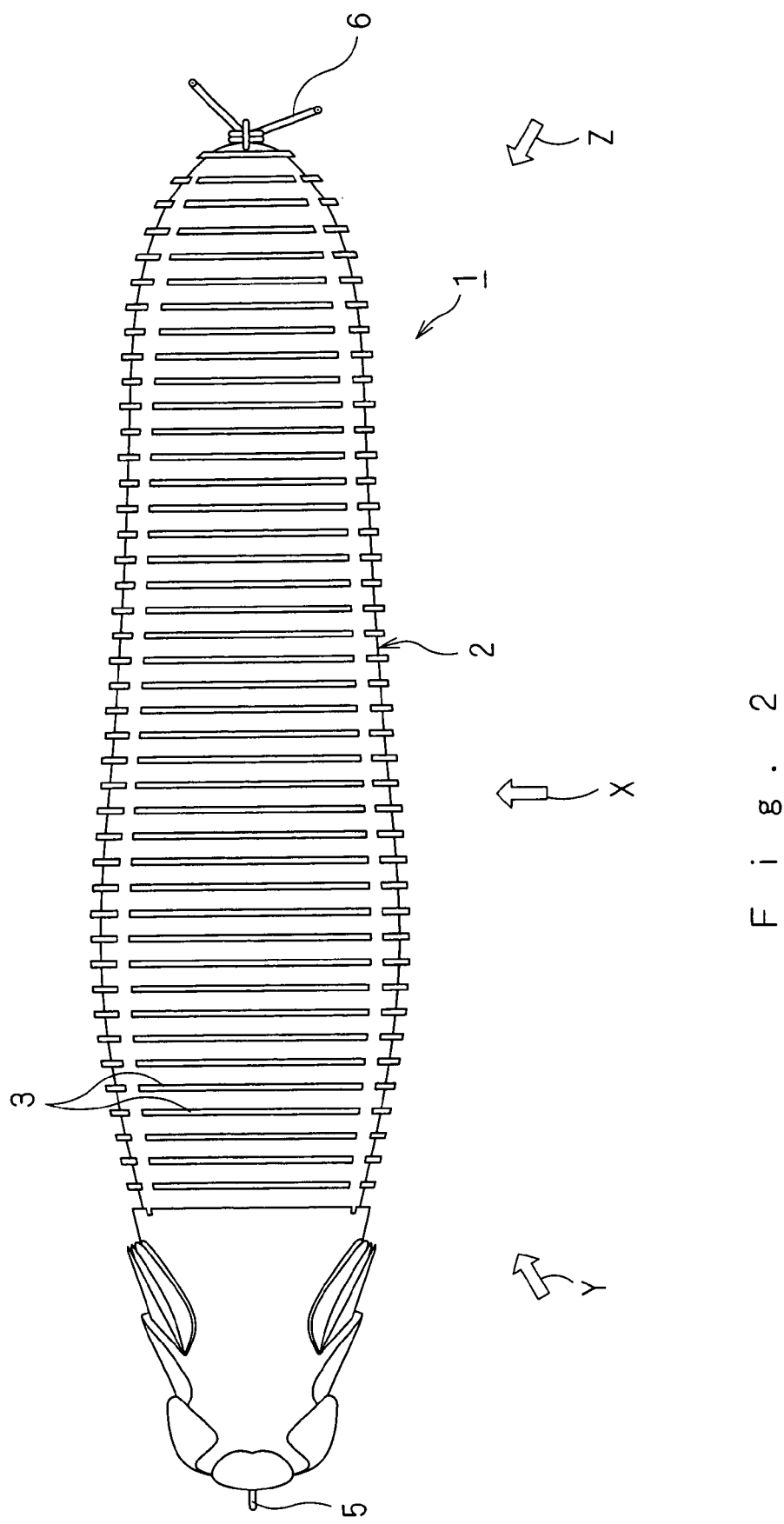
FIG. 2 is a plan view of the lure of the first embodiment.
Figure 3A:
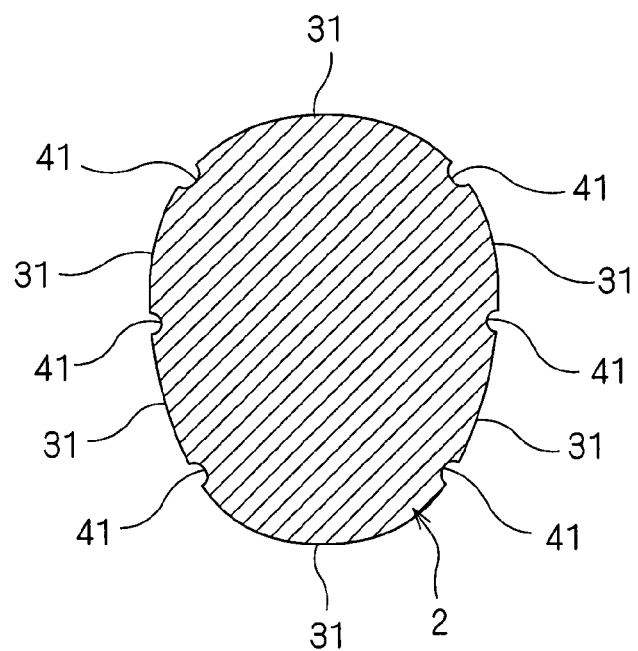
FIG. 3A is a cross sectional view taken along line I-I of FIG. 1.
Figure 3B:
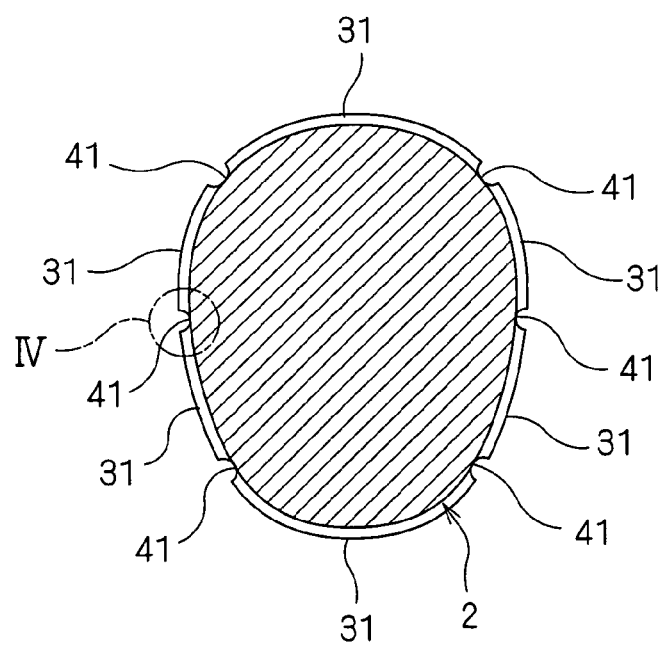
FIG. 3B is a cross sectional view taken along line II-II of FIG. 1.

In FIGS. 1 to 3, reference character 1 indicates a lure. The lure 1 includes a lure main body 2, long projections 31 formed on a surface of the lure main body 2, long grooves 41 formed traversing the long projections 31, a connecting part 5 arranged at a front part of the lure main body 2, and a fish hook 6 arranged at a back part of the lure main body 2.

The connecting part 5 is a member for connecting the lure to a line. The connecting part 5 is arranged by fixedly attaching a metal ring and the like to the lure main body 2.

Figure 13:
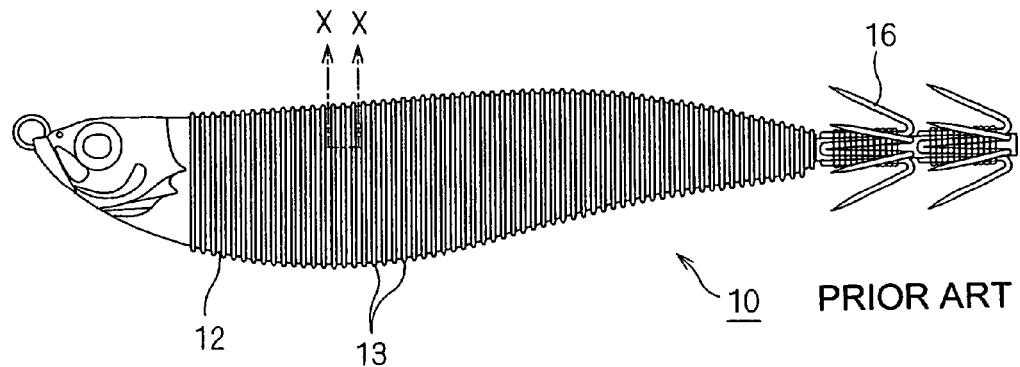
FIG. 13 is a front view showing a conventional lure.
Figure 14:
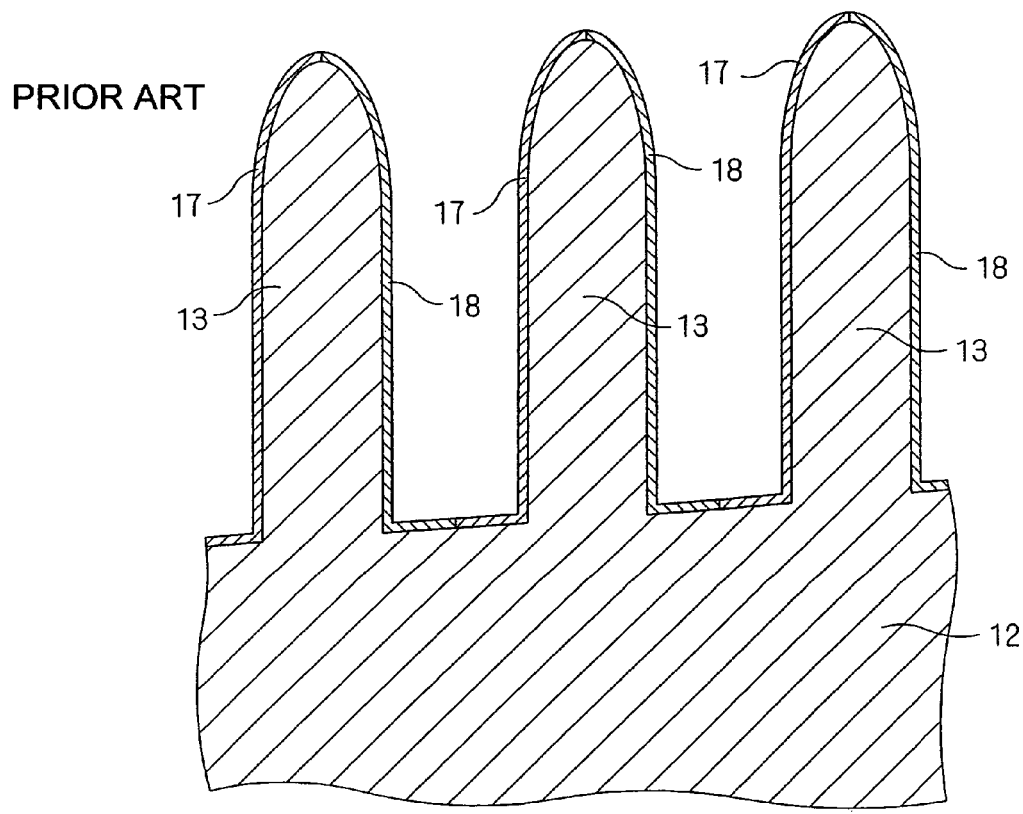
FIG. 14 is a cross sectional view taken along line X-X of FIG. 13.

The fish hook 6 is a member for hooking a target fish. Such a fish hook 6 is preferably used that a plurality of substantially J shaped hooks are connected (e.g., treble hook), as shown in FIG. 1. The fish hook 6 can be appropriately changed according to the target fish, where an umbrella hook (hook shown in FIG. 13) may be used as the fish hook 6 if the target fish is a squid.

The lure main body 2 is formed into a shape in which the entire shape resembles a small fish etc. The shape of the lure main body 2 may be appropriately changed according to the target fish and for example, the lure main body 2 may be formed into a shape that resembles shrimps and the like (not shown). The lure main body 2 has different horizontal to vertical ratio, where the length from the front part to the back part of the lure main body 2 (length in longitudinal direction) is formed longer than the vertical length (length in short direction).

The material of the lure main body 2 is not particularly limited, and may be formed from known material such as hard synthetic resin molded article such as ABS resin molded article, soft synthetic resin molded article such as urethane, foam resin molded article with foamed synthetic resin, wood, metal (include alloy), or a combination of two or more of the above materials. The inner configuration of the lure main body 2 may be solid or hollow.

The long projections 31 of a plurality of columns are formed on the surface of the lure main body 2. The long projection 31 of one column will now be described in detail. The long projection 31 is formed extending in the short direction of the lure main body 2. The long projection 31 has the projection projecting to the outer side from the surface of the lure main body 2 continuously connected in the short direction of the lure main body 2. Therefore, the long projection 31 has a form extending in an elongate form in the short direction of the lure main body 2.

Furthermore, the long projection 31 is formed lined in a plurality of columns in the longitudinal direction of the lure main body 2. The long projection 31 of each column is formed substantially parallel to each other. Each long projection 31 is formed at the core of the lure main body 2 excluding the head of the lure main body 2.

The long grooves 41 segmenting the long projections 31 of a plurality of columns are formed in the longitudinal direction of the lure main body 2. The long grooves 41 are formed by continuously connecting the concave part in the longitudinal direction of the lure main body 2. Therefore, the long groove 41 extends in an elongate form in the longitudinal direction of the lure main body 2. The long groove 41 traverses the long projection 31 of each column extending in the short direction of the lure main body 2. One long groove 41 is formed at the central position on both side surfaces of the core of the lure main body 2 and one at the upper and lower part on both side surfaces of the core. Therefore, three long grooves 41 extending in the longitudinal direction of the lure main body 2 are formed on the side surface of the core of the lure main body 2.

The cross sectional shape of the long projection 31 is not particularly limited and may take various shapes. For example, the shape described below is illustrated.

Figure 4:
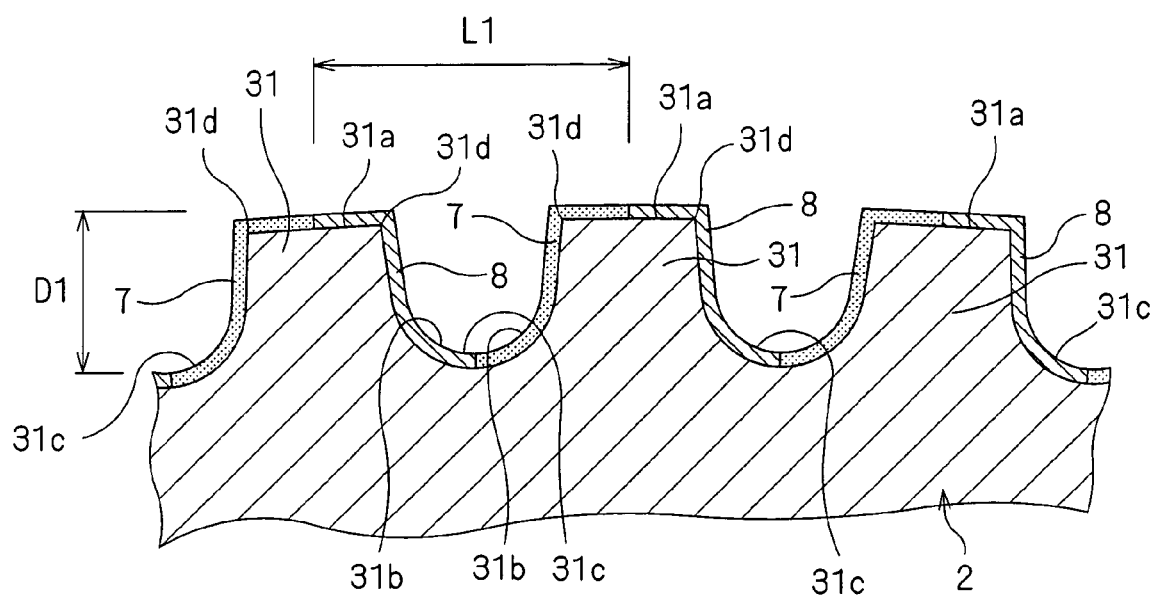
FIG. 4 is a view showing a detailed configuration of a long projection, and is an enlarged cross sectional view taken along line III-III of FIG. 1.

In the preferred embodiment, the cross sectional shape of the long projection 31 is shown in detail in FIG. 4. That is, the cross sectional shape of the long projection 31 has a vertex part 31a of the long projection 31 formed into a linear shape, and both ends 31d of the vertex of the long projection 31 formed at a right angle. Both base parts 31b of the long projection 31 are formed into a circular arc shape.

Figure 5A:
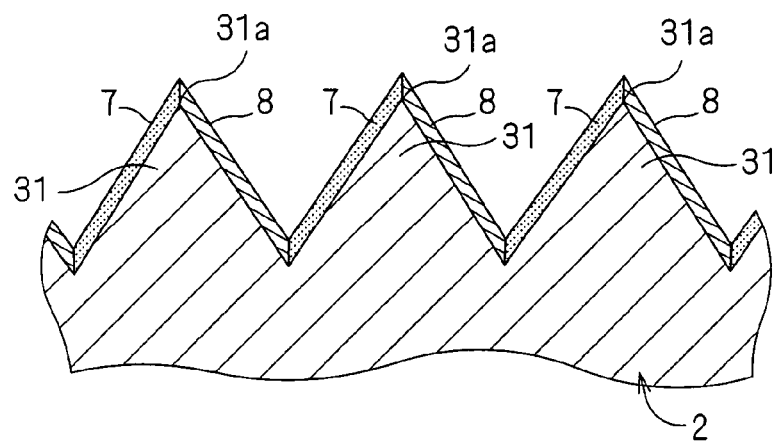
FIG. 5A is an enlarged cross sectional view showing a variant of a shape of the long projection.
Figure 5B:
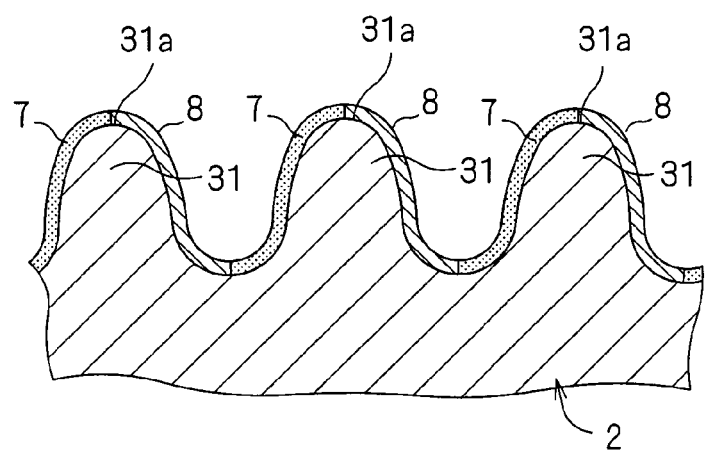
FIG. 5B is an enlarged cross sectional view showing another variant.
Figure 5C:
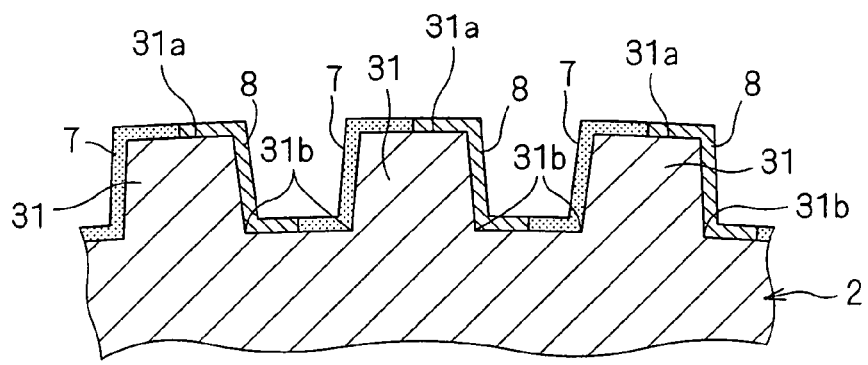
FIG. 5C is an enlarged cross sectional view showing still another variant.

The cross sectional shape of the long projection 31 is obviously not limited thereto, and may take various shapes. For example, the vertex part 31a of the long projection 31 may be formed into an angular shape, as shown in FIG. 5A, the vertex part 31a of the long projection 31 may be formed into a circular arc shape, as shown in FIG. 5B, the base part 31b of the long projection 31 may be formed into an angular shape, as shown in FIG. 5C etc.

The cross sectional shape of the long projection 31 preferably has the vertex part 31a of the long projection 31 formed into a linear shape, and both ends 31c of the vertex part 31a formed at a right angle (shown in FIG. 4). This is so that water current can be easily disturbed after hitting the lure main body 2 when the lure 1 is floating in water, thereby producing a great amount of waves around the lure main body 2.

The depth D1 (shown in FIG. 4) of the long projection 31 is not particularly limited. However, if the depth D1 is too shallow, there will be no point in arranging the long projection 31. If the depth D1 is too deep, dust tends to easily accumulate between the adjacent long projections 31, 31. In view of this, the depth D1 of the long projection 31 is preferably not less than 0.5 mm, more preferably not less than 0.8 mm, and most preferably not less than to 1.0 mm. The depth D1 of the long projection 31 is preferably not more than 4.0 mm, more preferably not more than 3.0 mm, and most preferably not more than 2.5 mm.

The interval L1 (interval L1 in each column of long projection 31) between the adjacent long projections 31, 31 is not particularly limited. However, if the interval L1 is too narrow, the dust that has entered between the adjacent long projections 31, 31 becomes hard to remove. If the interval L1 is too wide, the effect that the color changes depending on the viewing direction cannot be sufficiently exhibited. In view of this, the interval L1 between the adjacent long projections 31, 31 is preferably not less than 0.7 mm, more preferably not less than 1.0 mm, and particularly preferably not less than 1.2 mm. The interval L1 between the adjacent long projections 31, 31 is preferably not more than 2.5 mm, more preferably not more than 2.0 mm, and particularly preferably not more than 1.8 mm.

Figure 6:
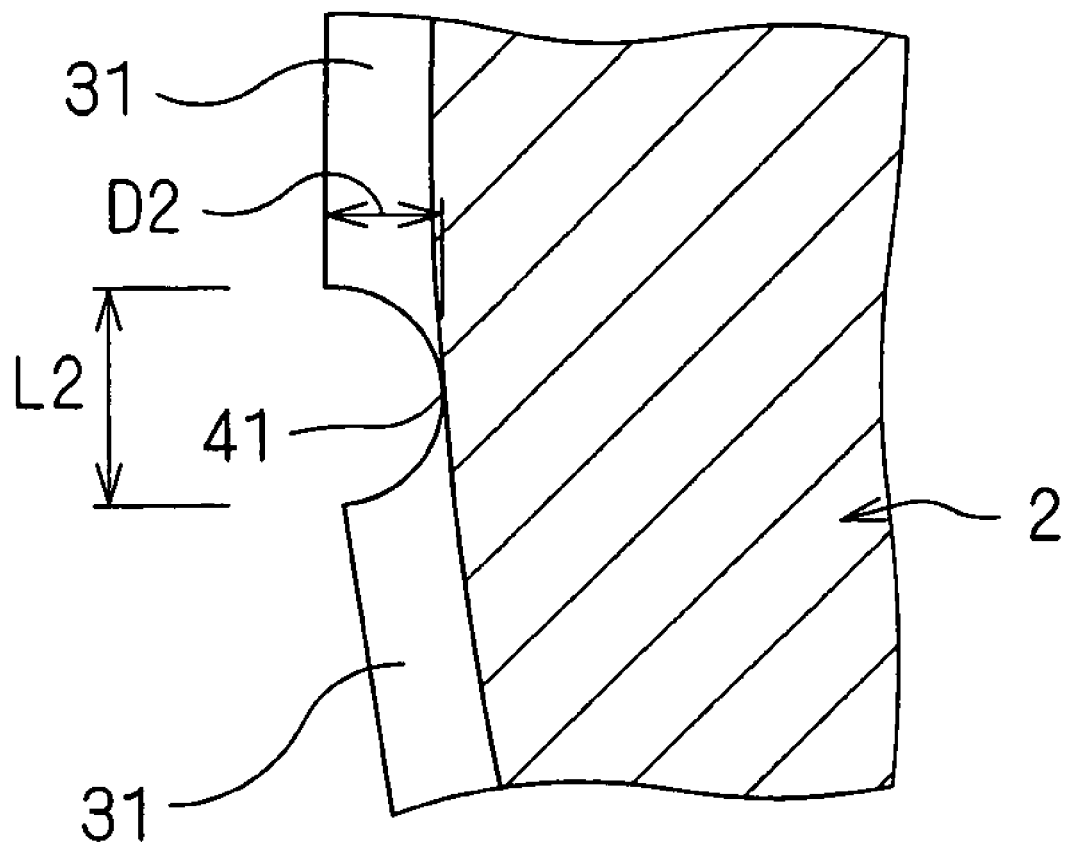
FIG. 6 is a view showing a detailed configuration of a long groove, and is an enlarged cross sectional view of portion IV circled in FIG. 3B.

The cross sectional shape of the long groove 14 is formed into a substantially U shape, as shown in FIG. 6. The cross sectional shape of the long groove 41 is obviously not limited thereto, and may be deformed into various shapes.

The depth D2 (shown in FIG. 6) of the long groove 41 is not particularly limited. Normally, the depth D2 of the long groove 41 is formed to be substantially the same as the depth D1 of the long projection 31. The width L2 of the long groove 41 is not particularly limited, but if the width L2 is too narrow, there is no point in arranging the long groove 41, and thus the width L2 of the long groove 41 is preferably not less than 0.5 mm, and more preferably not less than 1.0 mm. The upper limit of the width L2 of the long groove 41 is approximately not more than 10 mm.

Different colors are given to the surface of the long projection 31 of each column, as shown in FIG. 4. Specifically, the long projection 31 is divided into the left side surface and the right side surface with the vertex part 31a of the long projection 31 as the boundary. The first colored part 7 is arranged on the left side surface by giving a desired color to the left side surface of the long projection 31. The second colored part 8 is arranged on the right side surface by giving color different from that of the first colored part 7 to the right side surface of the long projection 31. More specifically, the first colored part 7 is arranged on the entire region (left side surface) from the center of the vertex part 31a of the long projection 31 to the center of the concave part 31c on the left side. The second colored part 8 is arranged on the entire region (right side surface) from the center of the vertex part 31a of the long projection 31 to the center of the concave part 31c on the right side.

The color of the first colored part 7 and the second colored part 8 is performed through spray painting, brush painting etc. as hereinafter described. Thus, the boundary between the first colored part 7 and the second colored part 8 is not necessarily separated by color in a definite manner. Therefore, the color of the first colored part 7 and the color of the second colored part 8 may mix at the center of the vertex part 31a of the long projection 31. Furthermore, the first colored part 7 may slightly run off to the right side from the center of the vertex part 31a of the long projection 31. Alternatively, the second colored part 8 may slightly run off to the left side from the center of the vertex part 31a of the long projection 31. Similarly, at the center of the concave part 31c, the color of the first colored part 7 and the color of the second colored part 8 may mix at the center of the concave part 31c. Alternatively, the fist colored part 7 or the second colored part 8 may slightly run off to the left side or the right side from the center of the concave part 31a.

Therefore, the first colored part 7 and the second colored part 8 are not strictly separated by color, and only needs to be more or less separated to the left and the right at the vertex part 31a of the long projection 31.

The first colored part 7 and the second colored part 8 are not particularly limited as long they have different colors (not same in terms of vision) with respect to each other. The color is appropriately selected from various colors of a single color such as red, blue, yellow etc., color pattern made up of two or more colors, etc. For example, the first colored part 7 may be colored in red, and the second colored part 8 may be colored into patch patterns of blue and yellow.

The coloring method of the first colored part 7 and the second colored part 8 is not particularly limited, and the method of easily and conveniently applying ink is preferred such as a known method of spray painting, brush painting and the like. The coloring method is obviously not limited to ink application, and may be a method of attaching a colored film, or a colored metal foil (aluminum foil etc.). When the configuring material of the long projection 31 presents a desired color, the color of the forming material may be used as it is without particularly performing the coloring process.

Coating layer (not shown) such as varnish may be applied on the upper side of the first colored 7 and the second colored part 8, as necessary.

The lure 1 is used by tying the line to the connecting part 5 and throwing it in water.

According to the lure 1 of the present invention, the colors of the first colored part 7 and the second colored part 8 shown in FIG. 4 alternately appear when seen in a direction (direction of arrow X of FIG. 2) orthogonal to the side surface of the core of the lure main body 2. Thus, the side surface of the lure 1 appears to have a striped pattern.

When the lure 1 is seen in a direction diagonally from the left (direction of arrow Y of FIG. 2), only the color of the first colored part 7 shown in FIG. 4 appears. On the other hand, when the lure 1 is seen in a direction diagonally from the right (direction of arrow Z of FIG. 2), only the color of the second colored part 8 shown in FIG. 4 appears. For example, by changing the angle of viewing the lure 1 from the direction diagonally from the left to the direction diagonally from the right, it appears as if the color of the first colored part 7 and the color of the second colored part 8 have merged.

Therefore, the lure 1 of the present invention appears to have different colors depending on the viewing direction. Thus, the colors appear to be as if changing with the movement of the lure 1 when the lure is floated in water while pulling the line. Thus, the target fish that has recognized the lure 1 becomes very curious. A great fishing effect can thereby be expected by using the lure 1 of the present invention.

Furthermore, the lure 1 is formed with the long groove 41 that traverses the long projections 31 of each column. The long projections 31 are partially segmented according to the formation of the relevant long grooves 41. Thus, the air bubbles present between the adjacent long projections 31 move away from between the long projections 31 due to the action of the water current that flow through the long grooves 41 when the lure 1 is floating. Therefore, the lure 1 is less likely to have fine air bubbles accumulate between the long projections 31 in water. Thus, the lure of the present invention is satisfactory bit by the target fish (generally, the bite of the target fish is not satisfactory when fine air bubbles are present the surface of the lure).

Furthermore, when the vertex 31a of the long projection 31 is formed into a flat plane (the cross sectional shape of the vertex 31a is formed into a linear shape) and the ends 31d of the vertex 31a are formed at a right angle, a great amount of waves are produced when the lure 1 is floating in water. More specifically, when the lure 1 is floating in water, the water current hits the surface of the lure main body 2. When the vertex 31a is formed into a flat shape and the ends 31d of the vertex 31a are formed at a right angle, the water current hits the ends 31d of the vertex 31a, and a very small part of the water current tends to easily flow into the space between the long projections 31 of each column. As a result, a very small part of the water current that has hit the surface of the lure main body 2 is disturbed thereby producing a great amount of waves around the lure main body 2. The lure 1 that produces waves is well bitten by the target fish (Generally, fishes are sensitive to small waves in water).

Figure 7A:
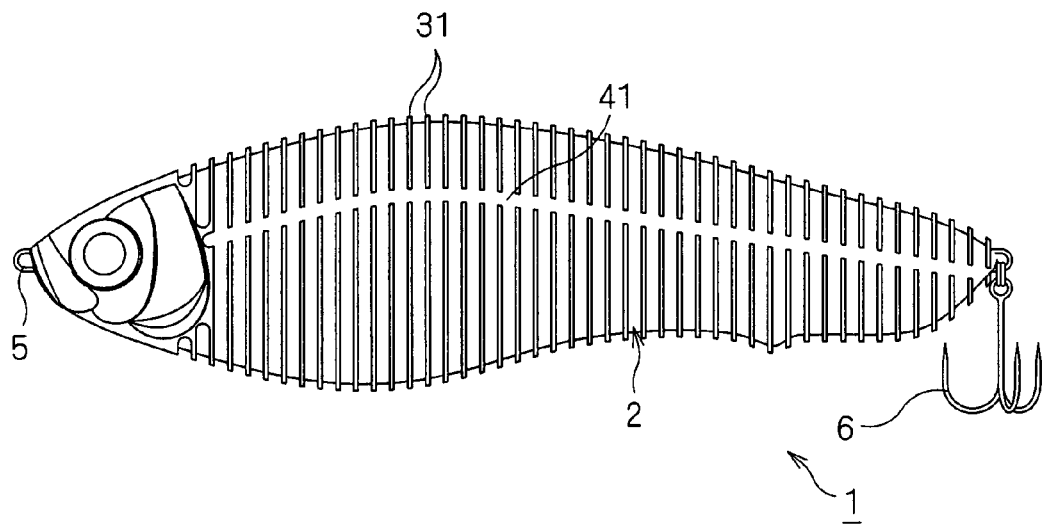
FIG. 7A is a front view showing a variant of the lure of the first embodiment.

In the first embodiment, three long grooves 41 are formed for one side surface of the lure main body 2, but the present invention is not limited thereto. The present invention may be a lure 1 in which one long groove 41 extending in the longitudinal direction is formed on one side surface. The lure of the relevant variant is shown in FIG. 7A.

Figure 7B:
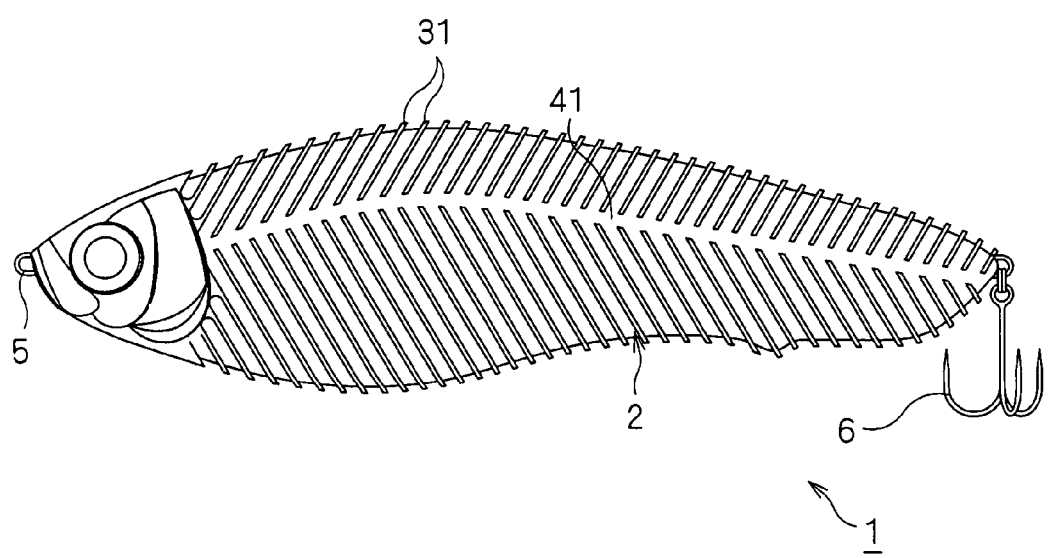
FIG. 7B is a front view showing another variant of the lure of the first embodiment.

In the first embodiment, the long projection 31 is formed extending straight in the short direction of the lure main body 2, but the present invention is not limited thereto. The present invention may, for example, be a lure 1 in which the long projections 31 are formed extending in a slanted manner. The lure 1 of the relevant variant is shown in FIG. 7B. In the case of the lure 1 of the relevant variant, the long grooves 41 traversing the long projections 31 are preferably formed extending in the longitudinal direction of the lure main body 2.

Furthermore, the long projection 31 extending in the short direction of the lure main body 2 may be formed extending in the shape of a circular arc.

In addition, although not particularly shown, the lure 1 in which the long projections 31 are formed extending in the longitudinal direction of the lure main body 2 may be provided. In the case of the lure 1 of the relevant variant, the long grooves 41 traversing the long projections 31 are preferably formed in the short direction of the lure main body 2.

Furthermore, the long projections 31 and the long grooves 41 are formed entirely on the side surface of the core of the lure main body 2 in the first embodiment, but in place thereof, the long projections 31 and the long grooves 41 may be partially formed on the side surface of the core of the lure main body.

Moreover, the first colored part 7 and the second colored part 8 are arranged at all the long projections 31 in the first embodiment, but in place thereof, the first colored part 7 and the second colored part 8 may be arranged only on some long projections 31.

Second Embodiment of the Invention

The second embodiment of the present invention will now be described.

Figure 8:
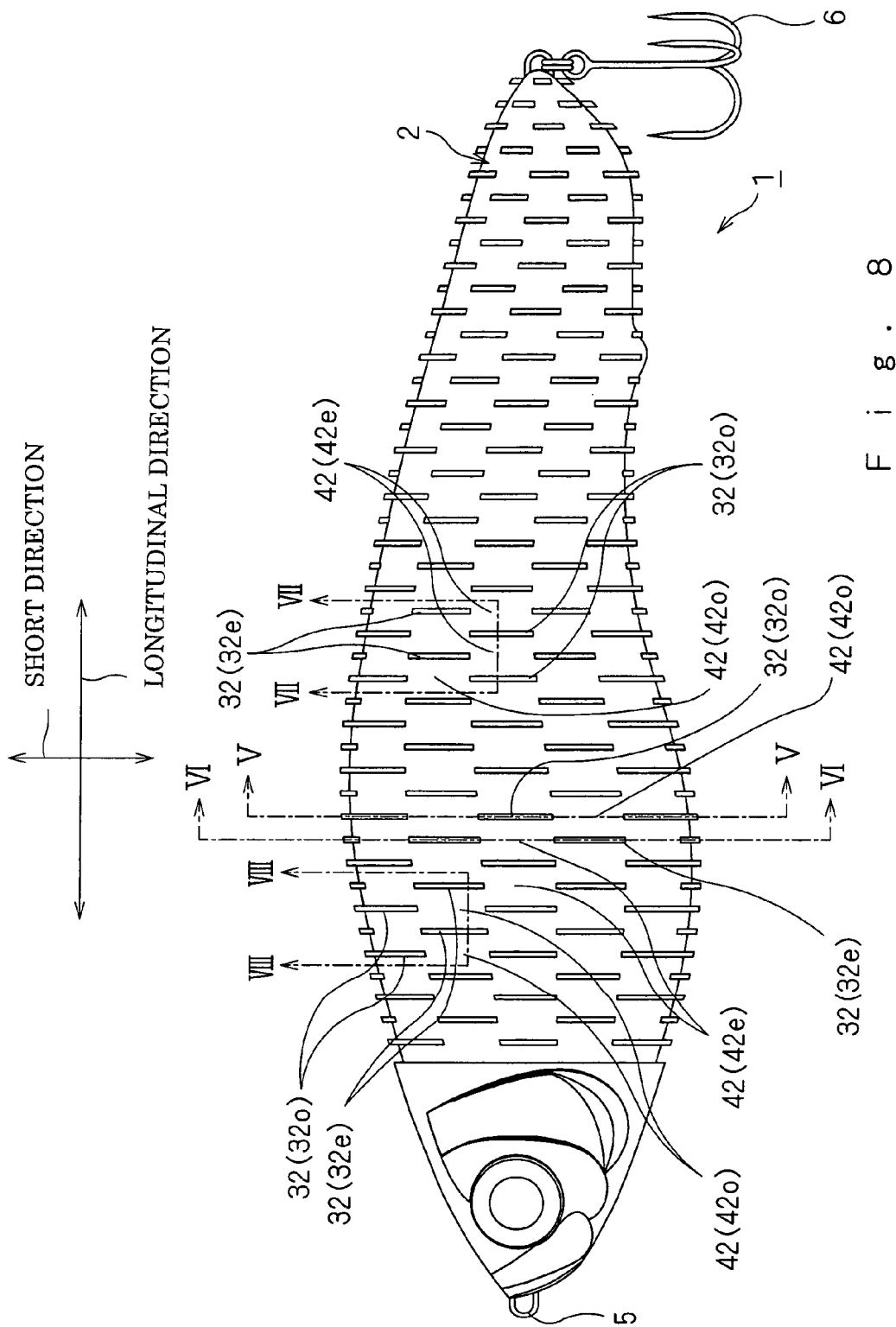
FIG. 8 is a front view showing a lure of a second embodiment.
Figure 9:
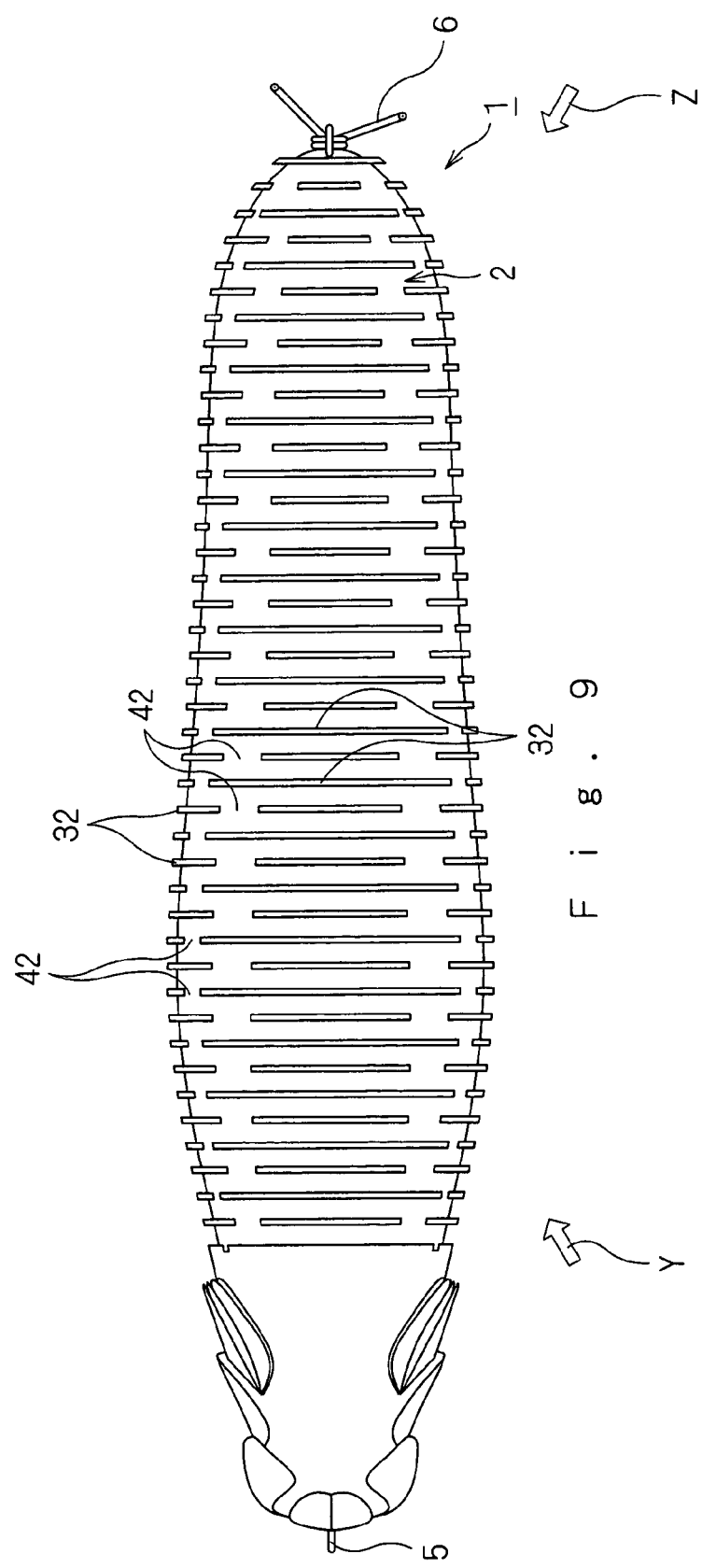
FIG. 9 is a plan view showing the lure of the second embodiment.
Figure 10A:
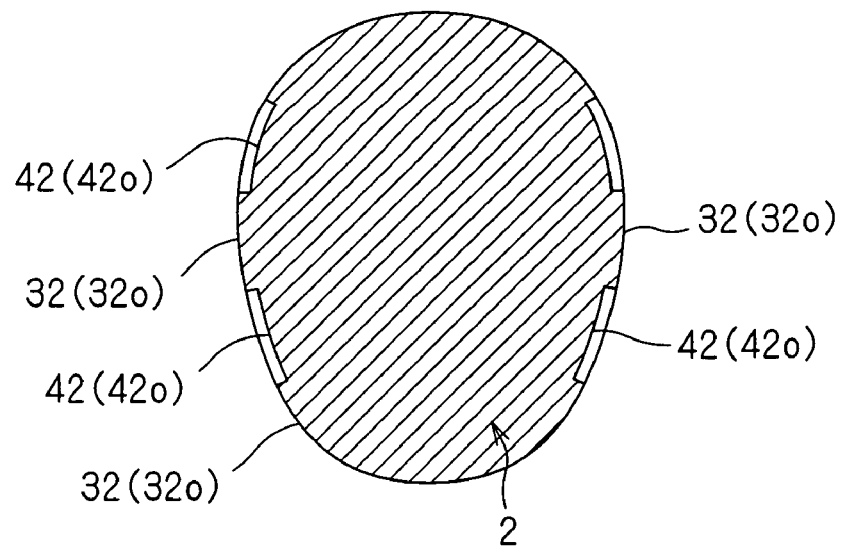
FIG. 10A is a cross sectional view taken along line V-V of FIG. 8.
Figure 10B:
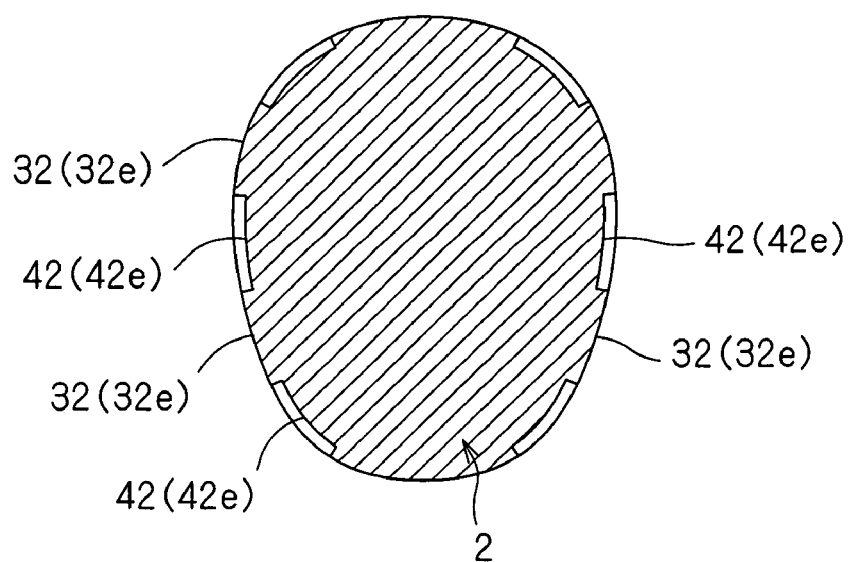
FIG. 10B is a cross sectional view taken along line VI-VI of FIG. 8.

In FIGS. 8 to 10, reference character 1 shows the lure of the second embodiment. The lure 1 includes a lure main body 2, a long projection 32 formed on the surface of the lure main body 2, a connecting part 5, and a fish hook 6.

The shape, material, structure and the like of the lure main body 2 are similar to those described in the first embodiment. The connecting part 5 and the fish hook 6 are also similar to the first embodiment.

In the lure of the second embodiment, the long projections 32 projecting from the surface of the lure main body 2 are formed alternately (staggered) in each column.

Specifically, the long projection 32 is formed extending in the short direction of the lure main body 2. In the short direction of the lure main body 2, the long projection 32 and the non-projection 42 are formed alternately continuing with a predetermined interval. The long projection 32 is formed by continuously connecting the projections projecting to the outside from the surface of the lure main body 2 in the short direction of the lure main body 2. The non-projection 42 is formed at the surface portion of the lure main body 2, and is the portion lower than the long projection 32.

A plurality of the columns in which the long projection 32 and the non-projection 42 are alternately connected in the short direction of the lure main body 2 are formed with a predetermined interval in the longitudinal direction of the lure main body. Each column lined in the longitudinal direction of the lure main body 2 is formed in parallel.

Figure 11A:
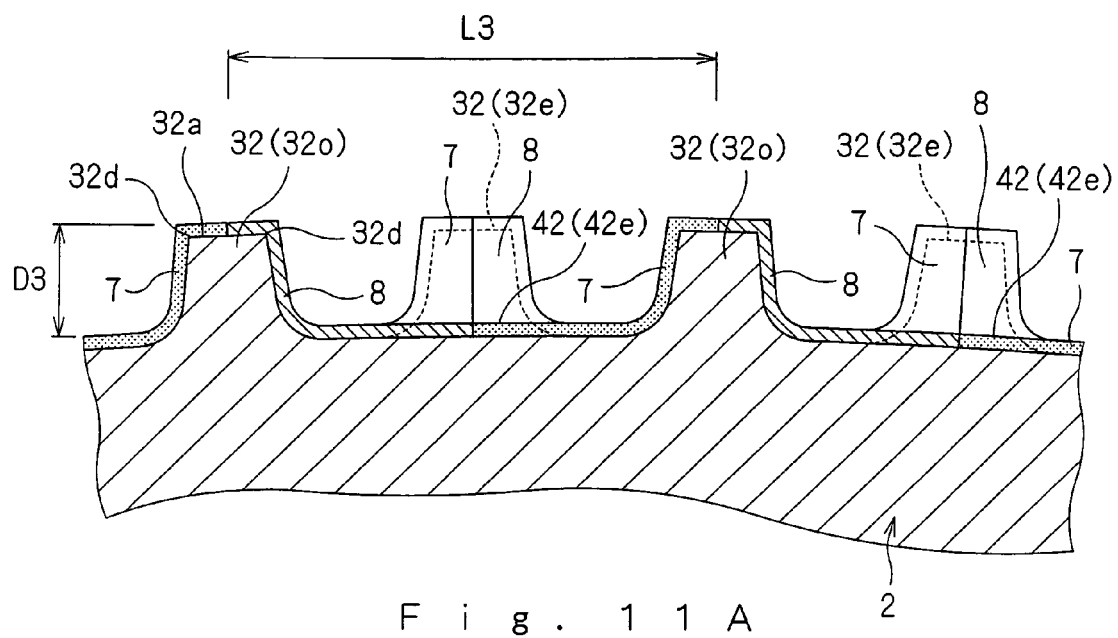
FIGS. 11A and 11B are views showing a detailed configuration of the long projection and a non-projection, where

As shown in FIGS. 8 and 11A, the long projection 32o in odd numbered columns is arranged between the non-projections 42e, 42e in adjacent even numbered columns. The non-projection 42e in the even numbered column is arranged between the long projections 32o, 32o in the odd numbered column. The odd numbered column refers to the odd numbered column of when numbering and counting the column number in order towards the right side of the lure main boy 2 with the column on the left end as the first column ("o" is given for the reference character of odd numbered column, "e" is given for the reference character of even numbered column).

Figure 11B:
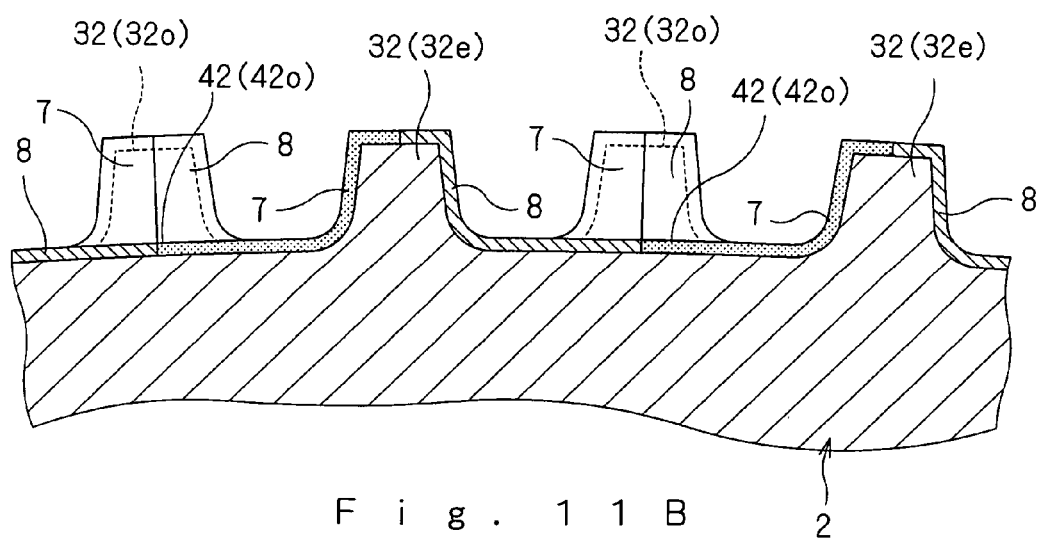

The non-projection 42o, 42o in the odd numbered column is arranged between the long projections 32e, 32e in the adjacent even numbered columns, as shown in FIGS. 8 and 11B. The long projection 32e in the even numbered column is arranged between the non-projections 42o, 42o in the odd numbered column.

The length in the short direction of one long projection 32 is not particularly limited but is preferably formed to about 3 mm to 10 mm.

The cross sectional shape of the long projection 31 is not particularly limited, and can be formed into a shape as shown in the first embodiment. Among them, the cross sectional shape of the long projection 31 preferably has the vertex 32a of the long projection 32 formed into a linear shape and both ends 32d of the vertex 32a formed at right angles, as shown in detail in FIGS. 11A and 11B. The depth D3 of the long projection 32 is preferably not less than 0.5 mm, more preferably not less than 0.8 mm, and most preferably not less than 1.0 mm. The depth D1 of the long projection 31 is preferably not more than 4.0 mm, more preferably not more than 3.0 mm, and most preferably not more than 2.5 mm.

The interval L3 between the long projections 32, 32 adjacent in the longitudinal direction of the lure main body (i.e., interval L3 of long projections 32o, 32o in odd numbered column (or long projection 32e, 32e in even numbered column)) is preferably not less than 1.0 mm, more preferably not less than 1.2 mm, and most preferably not less than 1.5 mm. The interval L2 between the long projections 32, 32 is preferably not more than 4.0 mm, more preferably not more than 3.0 mm, and most preferably not more than 2.5 mm.

Similar to the first embodiment, different colors are given to the surface of the long projection 32 of each column. In other words, the first colored part 7 is arranged on the left side surface of the long projection 32 of each column. The second colored part 8 different in color from the first colored part 7 is arranged on the right side surface of the long projection 32 of each column. Reference should be made to the first embodiment regarding the specific configuration of the first colored part 7 and the second colored part 8.

The lure 1 of the second embodiment is used by tying the line to the connecting part 5 and throwing it in water.

With regards to the lure 1 of the second embodiment, for example, only the color of the first colored part 7 is seen when the lure 1 is seen in a direction diagonally from the left (direction of arrow Y in FIG. 9). On the other hand, only the color of the second colored part 8 is seen when the lure 1 is seen in a direction diagonally from the right (direction of arrow Z in FIG. 9).

Therefore, the lure 1 of the second embodiment also appears to have different colors depending on the viewing direction.

The lure 1 of the second embodiment has the long projection 32 and the non-projection 42 alternately formed in the short direction of the lure main body 2. Thus, the air bubbles present between the long projections 32 of each column move away from the space between the long projections 31 by the action of the water current flowing through the non-projection 42 when the lure 1 is floating. Therefore, fine air bubbles are less likely to accumulate between the long projections 32, 32 of each column in water according to the lure 1 of the second embodiment.

When the vertex 31a of the long projection 31 is formed into a flat plane and the ends 31d of the vertex 31a is formed at a right angle, a very small part of the water current tends to easily flow into the space between the long projections 31 of each column. As a result, a very small part of the water current that has hit the surface of the lure main body 2 is disturbed thereby producing a great amount of waves around the lure main body 2.

The lure 1 of the second embodiment has the long projection 32o in the odd numbered column arranged between non-projections 42e, 42e in the adjacent even numbered columns, and the non-projection 42e in the even numbered column arranged between the long projections 32o, 32o in the odd numbered column.

Therefore, each elongate projection 32 in each column are independent from each other, and appears as if fins are formed at the side surface of the core of the lure main body 2.

The lure 1 of the present embodiment 1 presents an outer appearance that resembles more to the actual small fish.

Figure 12:
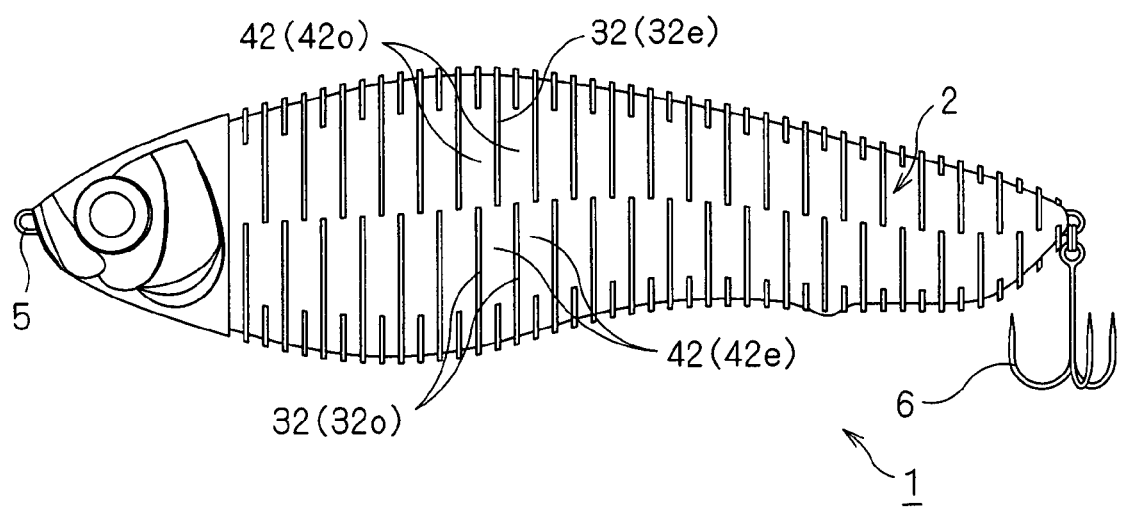
FIG. 12 is a front view showing a variant of the lure of the second embodiment.

FIG. 12 shows the lure 1 according to a variant of the second embodiment.

The lure 1 according to the variant has the long projection 32o in the odd numbered column arranged between the non-projections 42e in the even numbered column, similar to the second embodiment.

In the second embodiment of the present invention, the long projection 32 and the non-projection 42 are formed entirely on the side surface of the core of the lure main body 2, but in place thereof, the long projections 32 and the long grooves 42 may be partially formed on the side surface of the core of the lure main body 2.

Moreover, in the second embodiment, the first colored part 7 and the second colored part 8 are arranged at all the long projections 32, but in place thereof, the first colored part 7 and the second colored part 8 may be arranged only on some long projections 32.

It should be apparent to those skilled in the art that the present invention may be embodied in many other specific forms without departing from the spirit or scope of the invention. Therefore, the present invention is not to be limited to the details given herein, but may be modified within the scope and equivalence of the appended claims.

What is claimed is:

1. A fishing lure comprising:
   a lure main body;
   long projections projecting from an outside surface of the lure main body and extending in one direction of the lure main body;
   a plurality of columns of the long projections are formed lined in another direction of the lure main body;
   a long groove traversing the long projections of the plurality of columns is formed on the outside surface of the lure main body in another direction of the lure main body;
   a first colored part given a predetermined color is arranged on a left side surface of the long projection; and
   a second colored part given a color different from the color of the first colored part is arranged on a right side surface of the long projection,
   wherein
   the one direction of the lure main body is a short direction of the lure main body and the another direction of the lure main body is formed extending in a longitudinal direction of the lure main body,
   the outside surface of the lure main body is an outermost surface of the fishing lure, and
   the long projections have a plurality of varying lengths.

2. The lure according to claim 1, wherein the first colored part and the second colored part are arranged on all the long projections formed on the lure main body.

3. The lure according to claim 1, wherein a plurality of the long groove are formed.

4. The lure according to claim 1, wherein the long projections and the long groove are formed entirely or partially on a side surface of a core of the lure main body.

5. The lure according to claim 1, wherein an interval between the adjacent long projections is formed not less than 0.7 mm and not more than 2.5 mm.

6. The lure according to claim 1, wherein a vertex of the long projection is formed into a flat plane.

7. The lure according to claim 1, wherein the long groove traversing the long projections of the plurality of columns is formed at a central position on both side surfaces of the lure main body.

8. The lure according to claim 7, further comprising an upper long groove and a lower long groove at upper and lower parts respectively on the both side surfaces of the lure main body.

9. The lure according to claim 1, wherein at least one of the long projections includes a vertex part having a linear shape.

10. The lure according to claim 1, wherein at least one of the long projections includes a vertex part having an angular shape.

11. The lure according to claim 1, wherein at least one of the long projections includes a vertex part having a circular arc shape.

12. The lure according to claim 1, wherein the long groove is non-linear.

13. The lure according to claim 1, wherein an interval between the adjacent long projections is designed to channel air bubbles.

14. The lure according to claim 1, wherein the long groove is designed to release air bubbles.

15. The lure according to claim 1, wherein a depth of the long groove is formed to be substantially the same as a depth of an interval between the adjacent long projections.

16. The lure according to claim 1, wherein a width of the long groove is formed not less than 0.5 mm and not more than 10 mm.

17. The lure according to claim 1, wherein the long projections and the long groove are in contact with water.

18. A lure comprising:
   a lure main body; and
   long projections of varying lengths projecting in a short direction from an outside surface of the lure main body, and said long projections are formed linearly in a plurality of columns in a longitudinal direction of the lure main body substantially parallel to each other, wherein
   a long groove traversing the long projections of the plurality of columns is formed on the outside surface of the lure main body in a longitudinal direction of the lure main body,
   a first colored part having a predetermined color is arranged on a left side surface of at least one of said long projections, and a second colored part having a color different from the color of the first colored part is arranged on a right side surface of said at least one of said long projections, and
   the outside surface of the lure main body is an outermost surface of the lure.

* * * * *